(12) United States Patent
Cohn et al.

(10) Patent No.: US 7,792,894 B1
(45) Date of Patent: Sep. 7, 2010

(54) GROUP ALGEBRA TECHNIQUES FOR OPERATING ON MATRICES

(75) Inventors: Henry L. Cohn, Bellevue, WA (US); Balázs Szegedy, Bellevue, WA (US); Christopher M. Umans, Pasadena, CA (US)

(73) Assignees: Microsoft Corporation, Redmond, WA (US); California Institute of Technology, Pasadena, CA (US)

( * ) Notice: Subject to any disclaimer, the term of this patent is extended or adjusted under 35 U.S.C. 154(b) by 1534 days.

(21) Appl. No.: 11/011,302

(22) Filed: Dec. 13, 2004

Related U.S. Application Data (60) Provisional application No. 60/560,007, filed on Apr. 5, 2004.

(51) Int. Cl.
G06F 7/52 (2006.01)
(52) U.S. Cl. .................... 708/607; 708/405
(58) Field of Classification Search .......... None
See application file for complete search history.

(56) References Cited

U.S. PATENT DOCUMENTS

| | | | | |
|---|---|---|---|---|
| 5,099,447 | A * | 3/1992 | Myszewski | 708/607 |
| 5,206,822 | A * | 4/1993 | Taylor | 708/607 |
| 5,301,342 | A * | 4/1994 | Scott | 711/111 |
| 5,968,112 | A * | 10/1999 | Kirschenbaum et al. | 708/405 |
| 2003/0188250 | A1* | 10/2003 | Ashikhmin | 714/758 |

OTHER PUBLICATIONS

Triple Product Architectures for Fast Signal Processing; J.L. Aravena; IEEE Transactions on Circuits and Systems, vol. 35, No. 1 Jan. 1988; pp. 119-122.*
Henry Cohn and Christopher Umans, "A Group-theoretic Approach to Fast Matrix Multiplication," *Proceedings of the 44th Annual Symposium on Foundations of Computer Science*, Oct. 31, 2003, Copyright © IEEE 2003, pp. 438-449 and slide show (28 pages).
Peter Bürgisser, Michael Clausen, and M. Amin Shokrollahi, "Algebraic Complexity Theory," Chapters 13-16, © Springer-Verlag Berlin Heidelberg 1997, 80 pages.
D. Coppersmith and S. Winograd, "Matrix multiplication via arithmetic progressions," *J. Symbolic Computation*, 9:251-280, 1990.
V. Strassen, "Gaussian elimination is not optimal," *Numerical Mathematics*, 13:354-356, 1969.

* cited by examiner

*Primary Examiner*—Lewis A Bullock, Jr.
*Assistant Examiner*—Michael Yaary
(74) *Attorney, Agent, or Firm*—Klarquist Sparkman, LLP (57) ABSTRACT

A computer system is configured to create a product matrix of data from two matrices of data through the use of a representation in a group algebra. The matrices are represented in a group algebra based on a mathematical group adhering to certain criteria. Then the representations are mapped to vectors in a multidimensional vector space where their product can be obtained by reduction into a block-diagonal matrix multiplication which can be recursively computed by the same process. Multiple matrix multiplications can also be performed simultaneously though selection of a group which satisfies certain properties. Through this process, computational time improvements are obtained.

33 Claims, 4 Drawing Sheets

Multiplication Software Module Performing
Matrix Multiplication Techniques 480

GROUP ALGEBRA TECHNIQUES FOR OPERATING ON MATRICES

CROSS-REFERENCE TO RELATED APPLICATION

This application claims the benefit of U.S. Provisional Application No. 60/560,007, filed Apr. 5, 2004.

TECHNICAL FIELD

The technical field relates generally to improving computing performance for operations utilizing large data matrices.

BACKGROUND

As computing power increases, scientists and engineers increasingly rely on a computer's abilities to perform operations on large sets of physical or statistical data. In other cases, large sets of data are created at an internal state of the execution of a computer program and must be operated on for the program to continue. Oftentimes, these data sets are maintained in the form of matrices. A frequent task of a programmer working on a program to manipulate large matrices is to minimize the time taken when multiplying these matrices to produce a third, or product matrix.

Traditionally, the process of multiplying two matrices of size n×n would take $2n^3$ steps to complete. For many applications, the fact that the processing time grows with the cube of the size of the matrix means that computational times can become unwieldy. In order to improve performance, various alternative matrix-multiplication methods have been proposed, beginning with the work of Strassen in 1969 and continuing to the work of Coppersmith and Winograd in 1987. Each of these techniques has given methods of multiplying matrices which takes fewer than $2n^3$ steps. Unfortunately, the newer techniques have become increasingly specialized and difficult to implement. Additionally, there has been little improvement on these techniques in recent years, reaching a best bound for matrix multiplication of $O(n^{2.38})$ steps, meaning the number of steps is bounded by a constant times $n^{2.38}$. Current methods have thus reached a point of stagnation with respect to performance improvements.

What is needed is a framework for techniques of efficient multiplication of large matrices which provides results in fewer than $2n^3$ steps.

SUMMARY

Systems and techniques for improved-performance matrix multiplication are described. A system can contain a computer-readable storage medium containing two matrices and a matrix multiplication module. The matrix multiplication module can be configured to represent the stored matrices in a group algebra created from a group, compute the product of the representations, and then retrieve the product matrix from the product in the group algebra.

A computer-readable medium can comprise instructions that cause a computer to execute a method consisting of receiving two matrices, selecting a group, representing the matrices in a group algebra created from the group, computing the product of the representations, and then retrieving the product matrix from the product in the group algebra.

Additional features and advantages will be made apparent from the following detailed description of embodiments that proceeds with reference to the accompanying drawings.

DETAILED DESCRIPTION

The following is related to systems and techniques for a process of matrix multiplication utilizing group-theoretic representation of matrices. The systems and techniques allow for representation of matrices in a group algebra, followed by the mapping of the representations into vectors in a multidimensional vector space, where the matrices can be multiplied. In any of the technologies described herein, this multiplication can involve the use of reduction of the multiplication of the vectors into one or more block-diagonal matrix multiplication problems (a block-diagonal matrix multiplication is equivalent to a collection of smaller matrix multiplication problems). Thus, in any of the examples described herein, the techniques can convert a matrix multiplication into a group algebra multiplication and then back into matrix multiplication on smaller matrices, providing a recursive method of multiplying matrices. Theoretical support for various statements found herein can be found in H. Cohn & C. Umans, "A Group-theoretic Approach to Fast Matrix Multiplication," Proceedings of the 44th Annual Symposium on Foundations of Computer Science, 11-14 Oct. 2003, Cambridge, Mass. IEEE Computer Society, pp. 438-449 ["Cohn & Umans"], which is hereby incorporated by reference.

Example 1

Exemplary Groups, Rings, and Fields

As it is used in this document, the term "group" is intended to refer to a mathematical set along with a binary operation satisfying the group properties of closure, associativity, the identity property, and the inverse property. The term "group" should not be confused with a set or any general non-structured collection of numbers or objects.

As it is used in this document, the term "ring" is intended to refer to a mathematical set along with two binary operations where one of the binary operations satisfies the group properties described above on the entire set along with the distributive property, and the other binary operation satisfies the closure, associativity, and identity properties for a set comprising every element of the original set except for the additive identity element.

As it is used in this document, the term "field" is intended to refer to a ring which also satisfies the multiplicative inverse property for the set comprising every element of the original set except for the additive identity element. Exemplary fields are discussed, for example, in Example 3 below.

Example 2

Exemplary Group Algebras

As it is used in this document, the term "group algebra" is intended to refer to the structure defined on page 439 of Cohn & Umans. Thus, for a group G and a field F, every element of a group algebra F[G] comprises a formal sum $$\sum_{g \in G} a_g g,$$

with each $a_g \in F$, and with the product of two elements defined as:

$$\left( \sum_{g \in G} a_g g \right) \cdot \left( \sum_{h \in G} b_h h \right) = \sum_{f \in G} \left( \sum_{gh=f} a_g b_h \right) f.$$

The word "algebra" as utilized herein should not be confused with the generalization of arithmetical computation utilizing letters to represent numbers.

Example 3

Exemplary Processes for Creating Product Matrices

Figure 1:
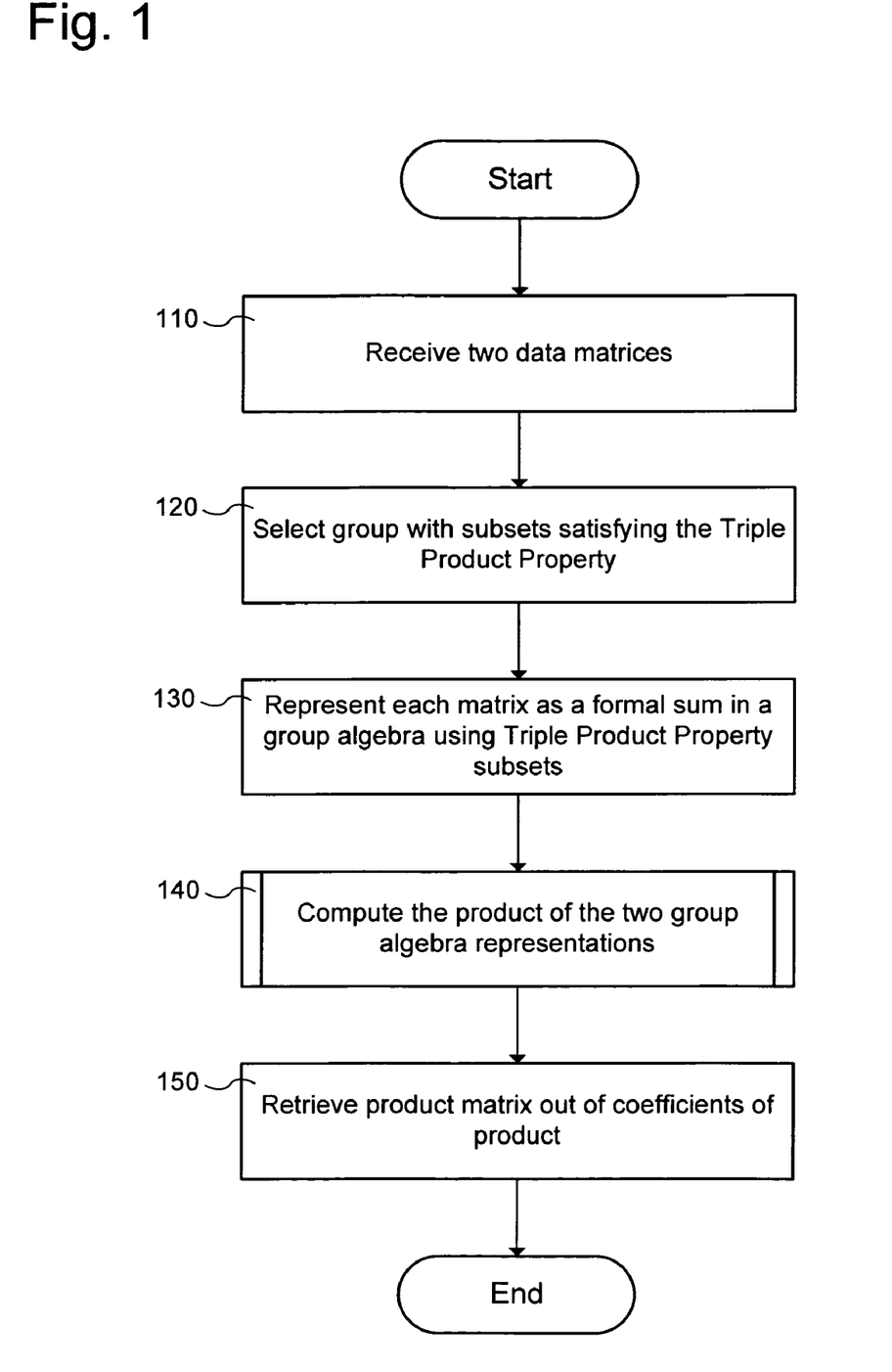
FIG. 1 is a flowchart illustrating an exemplary process for creating a product matrix from two matrices of data.

The processes and techniques will be described herein with reference to the figures and Cohn & Umans. While Cohn & Umans describes particular properties of some methods described herein, these are not to the exclusion of alternate embodiments that are described elsewhere in this document or equivalents of those described. Although the discussion of Question 4.1 on page 443 of Cohn & Umans discusses the possibility that Question 4.1 could be answered in the negative, research has discovered group structures which satisfy the question; examples of these are illustrated below. Thus Question 4.1 should now be considered to have been affirmatively answered. FIG. 1 illustrates one exemplary implementation of a process for multiplying matrices by transforming them in relation to a mathematical group. In various implementations, the processes of FIG. 1 may be performed in different order, may be combined into larger processes, or may be split into smaller ones.

The process of FIG. 1 begins at block 110, wherein two data matrices are received by a computer system. In any of the examples described herein, these data matrices can be received directly into computer memory; alternately or additionally, they can be recorded on storage medium. In any of the examples described herein, the data matrices can comprise entries from a field. Examples of infinite potential fields that may comprise matrix entries include, but are not limited to, complex numbers, real numbers, rational numbers; in any of the examples described herein, integers can be represented in a field such as rationals, reals, or complex numbers. Additionally, in any of the examples described herein, the fields may be finite; one example of this would be the field of integers modulo p, where p is a prime where the characteristic of the field does not divide the order of the group. In any of the examples described herein, if the field does not contain appropriate elements for computing the Discrete Fourier Transform, a suitable extension field can be used. Alternately, in any of the examples described herein, the data matrices can comprise entries which lie in any ring over a field; one example is matrices over a field. While the descriptions in Cohn & Umans involve the use of complex numbers, this does not describe a limitation, but rather one example of a process. In various implementations these may be represented in binary form, floating point representation, or as ratios.

The process continues to block 120, where a group is chosen to facilitate the multiplication. In any of the examples described herein, the group can contain three subsets which satisfy the triple product property described in Definition 2.1 of Cohn & Umans. In one implementation three subsets $S_1$, $S_2$, $S_3$ of a group G satisfy the Triple Product Property if, for integers $n_1$, $n_2$, $n_3$ such that $|S_i|=n_i$ and for $q_i \in \{S_1 S_2^{-1}: s_1 s_2 \in S_i\}$, if $q_1 = q_2 = q_3 = 1$, then $q_1 = q_2 = q_3 = 1$. In different terminology, if G contains subsets of sizes $n_1$, $n_2$, and $n_3$ satisfying the Triple Product Property, G is said to "realize $\langle n_1, n_2, n_3 \rangle$."

The sizes of these sets can be related to the sizes of the indexes of the matrices. In one implementation, when multiplying matrices of sizes n×m and m×p, a group is chosen that realizes $\langle n, m, p \rangle$. In any of the examples the properties of the group can be folded into the process of FIG. 1; alternately a computer-readable representation of the group can be imported into the process when necessary. In practice, the selecting can be done beforehand, so it need not be performed during the process.

Next, at block 130, the process creates representations of each matrix in a group algebra created from the field of the matrix entries and the group selected at block 120. In one implementation, these representations are created using elements of subsets of the group which satisfy the Triple Product Property. In another, these representations are created using subsets of sizes related to the sizes of each matrix, as discussed above. The properties of a group algebra are described in greater detail on page 439 of Cohn & Umans. In any of the examples described herein, these representations can take the form of the formal sums illustrated above and pages 439 and 441 of Cohn & Umans. In one implementation, for matrices A and B, of sizes n×m and m×p, respectively, and a group G that realizes $\langle n, m, p \rangle$ through subsets S, T, and U, respectively, the matrices can be represented by indexing them according to the subsets. Thus, in one such implementation the first matrix can be represented through the formal sum $$\sum_{s \in S, t \in T} A_{st} s^{-1} t,$$

and the second by $$\sum_{t' \in T, u \in U} B_{t'u} t'^{-1} u.$$

As described below in Example 15, a group with subsets satisfying the Triple Product Property can also be constructed from a smaller group containing a series of subsets satisfying the Simultaneous Triple Product Property.

Next, at block 140, the product of the two representations in the group algebra is computed. In any of the examples described herein, a straightforward multiplication in the group algebra can be used. Alternately, a different process is utilized for performing the group algebra multiplication; this process is described below in greater detail with respect to FIG. 2.

Finally, at block 150, the product of the representations in the group algebra is used to retrieve the entries of the product matrix by taking the coefficients of the formal sum which comprises the product of the representations. As an example, as Cohn & Umans explain on pages 439 and 441, the multiplication of the above-described representations reduces to a formal sum where the coefficient on a given $$s^{-1}u \in G \text{ is } \sum_{t \in T} A_{st}B_{tu} = (AB)_{su}.$$

Thus, these coefficients can then be used to populate the product matrix by reading them out of the formal sum which is the product in the group algebra according to the index provided by subsets satisfying the Triple Product Property.

Example 4

Figure 2:
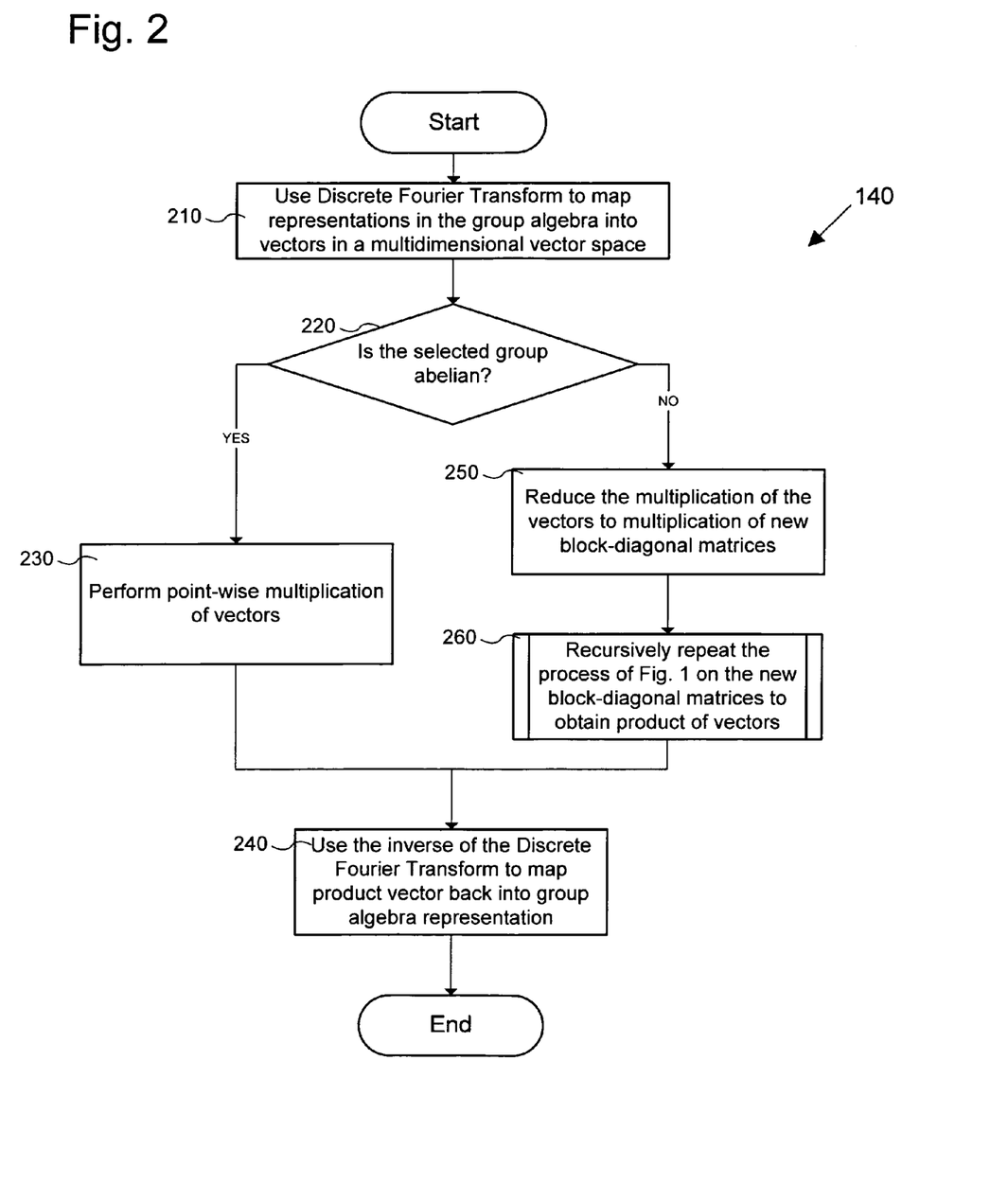
FIG. 2 is a flowchart illustrating an exemplary process for computing the product of group algebra representations of the data matrices used in the process of FIG. 1.

Exemplary Process for Creating the Product of Matrix Representations in a Group Algebra FIG. 2 illustrates an exemplary process by which the representations of the two matrices in the group algebra are multiplied to produce a product representation from which the product matrix can be recovered. In various implementations, the processes of FIG. 2 may be performed in different order, may be combined into larger processes, or may be split into smaller ones. The process starts at a block 210 where a Discrete Fourier Transform is used to map the representations into vectors in a multidimensional vector space of elements from the field of the matrices and whose dimension is equal to the size of the group selected at block 120.

Next, at decision block 220, the process determines if the group selected at block 120 is abelian or nonabelian. The term abelian is understood to refer to a group which satisfies the commutative property. If the group is abelian, the process continues to block 230, where the vectors are point-wise multiplied to create a product vector. Then, at block 240, the inverse of the Discrete Fourier Transform used at block 210 is used to map the product vector back into the group algebra product and the process ends.

However, as Cohn & Umans describe at pages 441 and 442, the use of abelian groups does not provide a performance benefit over the traditional matrix multiplication method. Thus, in any of the examples described herein, a nonabelian group can be selected at block 120. In this case the process moves from decision block 220 to block 250, where the multiplication of vectors is reduced to a series of smaller block-diagonal matrix multiplication problems, where the size of the matrices depends on the character degrees of the group selected at block 120. In any of the examples described herein, the matrices created for these matrix multiplication problems can be of smaller size than the original matrices, thus reducing the problem to a simpler case. An exemplary process of reduction to block-diagonal matrix multiplication from the vector multiplication is described in greater detail on pages 439-440 of Cohn & Umans. The process then continues to block 250, where the process of FIG. 1 is recursively applied to the new block-diagonal matrices. Once the recursion returns and a vector product is acquired, the process continues to block 260, and the process of FIG. 2 ends.

Example 5

Exemplary Group Selection

The flowcharts described in Examples 3 and 4 illustrate exemplary processes for creating a product matrix where the group selected at block 120 can have subsets which satisfy the Triple Product Property and whose sizes are related to the indices of the received matrices. In any of the examples described herein, the group selected can be one of a pre-determined collection of groups. In any of the examples described herein, the pre-determined set of groups can contain groups that are known to produce preferred performance benefits for matrices of particular sizes. In any of the examples described herein, the groups can be preferred for matrices of particular absolute sizes; alternately the groups can be preferred for matrices of sizes related to a mathematical relation, such as $n(n+1)/2$, or $p^2$, where p is a prime number. In any of the examples described herein, if the techniques are applied recursively, different groups with subsets that satisfy the Triple Product Property can be selected for each matrix multiplication performed. Alternately, a single group can be selected and used throughout recursive matrix multiplication.

Example 6

Exemplary Use of a Single Group

As mentioned above, in any of the examples described herein, a single group can be selected and used for each level of recursion. However, a single group may not be able to provide for group algebra representation for any sized matrix. If a group is selected which supports the multiplication process described above for multiplication of matrices of size n×n, in any of the examples described herein, modifications can be made which allow use of the group. In any of the examples provided herein, if the size N of the matrices is larger than n and is a multiple of n, then the N×N matrix can be partitioned to create an n×n matrix whose elements are themselves each matrices of size (N/n)×(N/n). In this situation, the procedures described above can be used, with the coefficients of the formal sums and the elements of the vectors being (N/n)×(N/n) matrices. Thus, depending on the size of the matrix and the choice of group, the processes described herein can be done on matrices comprising entries from a field or matrices comprising entries which are themselves matrices. Then, if the group has character degrees $d_1, d_2, \ldots, d_i$, and if the problem is reduced to a series of matrix multiplications, the sizes of the newly-created matrix multiplications will be $(d_1 N/n), (d_2 N/n), \ldots, (d_i N/n)$ and the process can recursively continue, further partitioning the new matrices if necessary. While this example implies the use of square n×n matrices, in any of the examples described herein, non-square matrices can be multiplied using groups which satisfy the Triple Product Property for their indices.

In any of the examples described herein, if a group is selected which supports the multiplication process for multiplication of matrices of size n×n and the received matrices are not of sizes that are multiples of n, then the matrices can be made into matrices of sizes which are multiples of n by padding (e.g., the bottom and/or right side) with 0s to bring the matrix to the right size. This padding can also be performed for matrices which are not square to create square matrices.

Example 7

Exemplary Group Structures

As also mentioned in Cohn & Umans, various groups can satisfy the requirements necessary to facilitate the process described above. One of these is the symmetric group of size n(n+1)/2. Another is the class of linear groups $SL_n(F_q)$, which are groups of square matrices of determinant 1 with each square matrix comprising entries from a finite field $F_q$. Yet another example is the family of groups described in terms of the wreath product in section 7.2 of Cohn & Umans. Additional examples of useful wreath products are provided in Example 14. Other group examples include Frobenius groups and dihedral groups. Additionally, from any exemplary group satisfying the Triple Product Property additional exemplary groups can be derived by taking direct powers or group products. Any of the exemplary group structures can be used in any of the examples described herein.

Example 8

Exemplary Applications

Determining Gaussian Distributions

The technologies described herein have numerous practical applications, providing performance benefits in computer-aided data manipulation and analysis situations. In one example, the technologies described herein are used to determine Gaussian distributions describing large amounts of inhomogenous data.

Thus, in one example, psychological data can be taken from a survey which quantitatively measures numerous psychological aspects and is given to a large number of people. Typically, data such as this will describe many subpopulations, each of which can be described using Gaussian distributions. However, finding these distributions and describing them can involve manipulation of many test answers for many subjects. Methods are known for performing such an analysis, such as the method described by S. Dasgupta in "Learning Mixtures of Gaussians," in Proceedings of the 40th Annual IEEE Symposium of the Theory of Computation, pages 634-644 (May 1999), which is hereby incorporated by reference. However, this method requires, as an intermediate step, data dimension reduction utilizing the multiplication of large matrices. In such a situation, the techniques described herein provide a cognizable performance increase over traditional methods of matrix multiplication, facilitating such analysis.

In another example, data taken from recorded speech must be analyzed for meaning. Such analysis requires the manipulation of enormous sets of data to determine a mixture of Gaussian distributions. In such an application, measurements of sound, such as pitch and duration, can populate these large matrices. Thus, similarly to the example described above, the techniques described herein are useful to the improved analysis of recorded speech.

Example 9

Exemplary Applications

Cryptographic Analysis

Many commonly used cryptographic systems, such as RSA and El Gamal, are based on the difficulty of solving number-theoretic problems such as factoring or the discrete logarithm. Methods known for breaking these systems conclude by solving simultaneous linear equations over the finite field with two elements. This is a particularly time-consuming part of the process, and it involves manipulating large matrices. In any of the examples described herein, the matrix-multiplication procedures can be used to perform parts of these cryptographic analysis methods.

Example 10

Exemplary Applications

Communications Networks

In another exemplary application, a computer or other communications network can be analyzed though the use of a graph transitive closure analysis to determine which network nodes (e.g. computers or other communications equipment nodes) are linked through the network to other computers. In any of the examples described herein, the network can be represented as an adjacency matrix, with each row and column representing a node and each entry containing a 1 or a 0 depending on whether its indexing nodes are directly connected. The technologies described herein can be used to then determine if non-directly connected nodes are connected through the graph by repeated multiplying of this matrix with the entries viewed as elements of the field of integers modulo p for some prime p greater than the number of nodes. In any of the examples described herein, after each matrix multiplication, nonzero entries are replaced by 1. Similarly, any of the technologies described herein can be used to determine shortest or fastest paths in a communications network. In any of the examples described herein, matrices can be used with entries describing distance between communications devices or communications bandwidth.

Example 11

Exemplary Applications

Partitioning

The technologies described herein can be used in various applications which utilize graph partitioning, which aims to divide a graph into two disjoint node sets with as few edges connecting the sets as possible. In any of the examples described herein, an adjacency matrix can be created for a graph. An eigenvector can then be computed from the matrix using any of the techniques described herein, because finding eigenvectors can be reduced to matrix multiplication. In many cases, the eigenvector can then be used to direct a partitioning of the graph into two collections. Further partitioning into more collections can be performed by successive application of this method on the graph. One example of this technique is described by Daniel Spielman and Shang-Hua Teng in "Spectral Partitioning Works: Planar Graphs and Finite Element Meshes," in Proceedings of the 37th Annual IEEE Conference on Foundations of Computer Science, 1996, which is hereby incorporated by reference.

Numerous applications of the technologies described herein can be useful for graphs describing large sets of data other complex problems. One example of use of this technique is found in computer network routing problems; when determining optimal layout for a network, it is useful to separate heavily-connected subsets of the network which are loosely connected to each other. In another example, the technologies described herein can be used to partition sets of data. In particular, the adjacency matrix may be created with entries indicating degree of similarity of objects rather than simply 1s and 0s. Thus, in one application, a large set of documents may be compared and partitioned according to how similar they are to each other; this can provide for improved searching techniques. In another, scientific data, such as DNA sequences, may be compared and partitioned. Genetic partitioning in particular can allow for separation of biological subjects in a study, either by species or genus, or by familial relationship. In any of the examples described herein, this similarity can be measured by degree of overlap between text or genomic sequences.

In another example, the techniques described herein can be used to partition sections of a large parallel computing program into multiple pieces which interact with each other in a minimal way, providing efficient parallel computing resource allocation. In another example, the techniques described herein can be used for improved layout on VLSI computer chips; because chips benefit from being laid out with components closer together when they interact more, the use of partitioning with these improved techniques can provide a starting point for more efficient layout analysis.

Example 12

Other Exemplary Applications

Software packages can facilitate both computer algebra and high-performance linear-algebra operations. In such a system, direct high-performance matrix multiplication is necessary and can be performed by any of the technologies described herein. Additionally, scientific and engineering problems, such as describing wave activity in fluids or heat flow, are described by partial differential equations, such as the wave equation or the heat equation. Differential equations such as these can be reduced to a discrete approximation, which is then solved by solving a large system of simultaneous linear equations. Using any of the examples described herein, these equations can be solved through a process utilizing matrix multiplication. Other applications involve the general solving of large groups of simultaneous linear equations, computation of matrix determinants, LUP decompositions, and matrix inversions.

Example 13

Exemplary Advantages

As Cohn & Umans and Example 14 below describe, the use of particular currently-known groups provides theoretically-proven performance improvements over traditional (i.e. direct entry-multiplication) methods of matrix multiplication. Additionally, the technologies described herein allow for extensions to new groups as they are discovered, and thus for different performance improvements.

Example 14

Further Exemplary Groups

1.

Let $C_n$ be the cyclic group of order n, let $H=C_n^3$ and let G be the semidirect product $C_2 \times H^2$ (also known as a wreath product of $C_2$ with H). In the semidirect product $C_2$ acts on $H^2$ by interchanging the two factors.

Let z denote the generator of $C_2$. We write elements of G in the form $(a, b)z^i$, with a, b$\in$H and i$\in\{0,1\}$.

Let $H_1$, $H_2$, $H_3$ be the three factors of $C_n$ in the product $H=C_n^3$, viewed as subgroups of H (so $H=H_1 \times H_2 \times H_3$). For notational convenience, let $H_4=H_1$. Define subsets $S_1$, $S_2$, $S_3 \subset G$ by $$S_i = \{(a,b)z^j : a \in H_i \setminus \{0\}, b \in H_{i+1}, j \in \{0,1\}\}.$$

In other words, an element $(a, b)z^j$ of G is in $S_i$ if j is 0 or 1, a is anything in $H_i$ other than 0, and b is anything in $H_{i+1}$.

Then the subsets $S_1$, $S_2$, $S_3$ in the group G satisfy the triple product property. When $n \geq 5$ this yields a useful matrix multiplication algorithm (the best exponent achieved is 2.9088 when n=17).

We use the term Nonzero Construction to denote the construction of three subsets satisfying the triple product property in the wreath product of a group with an abelian group by requiring certain coordinates in the abelian part to be nonzero (relative to some basis), as in this example or the next.

2.

Let m be an even parameter, $k=\binom{m}{m/2}$, and $N=k(k+1)/2$. Let $C_6$ be the cyclic group of order 6, and define $H=C_6^m$. Write elements of H as $(x_1, \ldots, x_m)$ with $x_i \in C_6$. For each subset $S \subset \{1, 2, \ldots, m\}$ with $|S|=m/2$, define $$R_S = \{(x_1, \ldots, x_m) \in H : x_i \neq 0 \text{ for } i \in S \text{ and } x_i = 0 \text{ otherwise}\}$$

and $$\overline{R}_S = \{(x_1, \ldots, x_m) \in H : x_i = 0 \text{ for } i \in S \text{ and } x_i \neq 0 \text{ otherwise}\}.$$

Number the k possible choices of S (i.e., subsets of $\{1, 2, \ldots, m\}$ of size m/2) in an arbitrary order from 1 to k. If the subset S is given number i, then define $T_i$ to be $R_S$, and define $\overline{T}_i$ to be $\overline{R}_S$.

There are N triples of integers (a, b, c) satisfying a, b, c$\geq$0 and a+b+c=k−1. Number them in an arbitrary order from 1 to N, and call them $t_1, t_2, \ldots, t_N$. Let $P_1(i)$ be the first coordinate of let $P_2(i)$ be its second coordinate, and let $P_3(i)$ be its third. (I.e., if $t_i=(a, b, c)$, then $P_1(i)=a$, $P_2(i)=b$, and $P_3(i)=c$.)

The group we will use is the semidirect product $G=S_N \times (H^3)^N$. Here $S_N$ is the symmetric group on N elements and it acts on $(H^3)^N$ by permuting the N coordinates. (This semidirect product is also known as a wreath product.)

Define three subsets $W_1$, $W_2$, $W_3$ of G as follows:

$$W_1 = \left\{ h\pi : \pi \in S_N, h \in \prod_{i=1}^{N} (T_{P_1(i)} \times \overline{T}_{P_2(i)} \times \{0\}) \right\}$$

-continued $$W_2 = \left\{ h\pi : \pi \in S_N, h \in \prod_{i=1}^{N} (\overline{T}_{P_1(i)} \times \{0\} \times T_{P_3(i)}) \right\}$$

$$W_3 = \left\{ h\pi : \pi \in S_N, h \in \prod_{i=1}^{N} (\{0\} \times T_{P_2(i)} \times \overline{T}_{P_3(i)}) \right\}$$

We call the process of obtaining $W_1$, $W_2$, $W_3$ from subsets $T_1, \ldots, T_k$ and $\overline{T}_1, \ldots, \overline{T}_k$ of an abelian group H according to these equations the Triangle Construction.

Then the three subsets $W_1$, $W_2$, $W_3$ of the group G satisfy the triple product property. We get a family of cases depending on the parameter m. For $m \geq 6$ the matrix multiplication algorithm has exponent better than 3. It continues to improve as m grows (it drops below 2.48 at m=4346 but never reaches 2.47).

Example 15

Exemplary Simultaneous Triple Product Property Techniques

1.

A class of examples can be obtained using the following framework:

Definition 1. We say that n triples of subsets $A_i$, $B_i$, $C_i$ (for $1 \leq i \leq n$) of a group H satisfy the Simultaneous Triple Product Property if for each i, the three subsets $A_i$, $B_i$, $C_i$ satisfy the Triple Product Property, and for all i, j, k, $$a_i(a'_j)^{-1} b_j(b'_k)^{-1} c_k(c'_i)^{-1} = 1 \text{ implies } i=j=k, \quad (1)$$

where $a_i \in A_i$, $a'_j \in A_j$, $b_j \in B_j$, $b'_k \in B_k$, $c_k \in C_k$ and $c'_i \in C_i$.

In most applications the group H will be abelian, in which case it is more conventional to use additive notation. In this notation the crucial implication (1) above becomes $$a_i - a'_j + b_j - b'_k + c_k - c'_i = 0 \text{ implies } i=j=k.$$

There are two ways to use subsets satisfying the Simultaneous Triple Product Property. First, they may be used to embed several independent matrix multiplication problems into one group algebra multiplication for H (e.g., in the group algebra $\mathbb{C}[H]$). As an example, for each i use the three sets $A_i$, $B_i$, $C_i$ as usual to arrive at a multiplication problem in $\mathbb{C}[H]$ that encodes the product of a $|A_i| \times |B_i|$ and a $|B_i| \times |C_i|$ matrix; call the factors in the resulting group algebra multiplication problem $\alpha_i$ and $\beta_i$. (Recall that one can read off the matrix entries of the product matrix as certain coefficients in the product $\alpha_i \beta_i$; which coefficients one uses is determined by the three subsets $A_i$, $B_i$, $C_i$.) To solve all these matrix multiplication problems simultaneously, compute the single product $$(\alpha_1 + \alpha_2 + \ldots + \alpha_n)(\beta_1 + \beta_2 + \ldots + \beta_n)$$

in $\mathbb{C}[H]$. One can read off each of the n independent product matrices exactly as before, as if it were the only output. The Simultaneous Triple Product Property guarantees that these different matrix products will not interfere with each other, and will all be computed correctly. Thus, one can simultaneously compute n independent matrix multiplications, which could be of interest in its own right or as an intermediate step in a larger calculation.

A second way to use the Simultaneous Triple Product Property is to use it to create three subsets satisfying the ordinary Triple Product Property in a larger group (which will be nonabelian even if H is abelian), as follows.

Let $S_n$ be the symmetric group on n elements, and let G be the semidirect product $S_n \ltimes H^n$, where $S_n$ acts on $H^n$ by permuting the n coordinates (this is also known as the wreath product of $S_n$ with H). We write elements of G as $(h_1, h_2, \ldots, h_n)\pi$, where $h_i \in H$ and $\pi \in S_n$.

We define three subsets of G:

$$W_1 = \{(h_1, h_2, \ldots, h_n)\pi : h_i \in A_i, \pi \in S_n\}$$

$$W_2 = \{(h_1, h_2, \ldots, h_n)\pi : h_i \in B_i, \pi \in S_n\}$$

$$W_3 = \{(h_1, h_2, \ldots, h_n)\pi : h_i \in C_i, \pi \in S_n\}$$

If the sets $A_i$, $B_i$, $C_i$ satisfy the Simultaneous Triple Product Property in H, then $W_1$, $W_2$, $W_3$ satisfy the Triple Product Property in G.

It is often convenient to apply this construction after increasing the size of the group H by taking direct powers, or (more generally) direct products. Specifically, given two groups H and H' with subsets $A_i$, $B_i$, $C_i \subset H$ (for $1 \leq i \leq n$) and $A'_{i'}$, $B'_{i'}$, $C'_{i'} \subset H'$ (for $1 \leq i' \leq n'$) satisfying the Simultaneous Triple Product Property, define nn' triples of subsets in H×H', indexed by (i, i') with $1 \leq i \leq n$ and $1 \leq i' \geq n'$, by $$A_{(i, i')} = A_i \times A'_{i'}, B_{(i, i')} = B_i \times B'_{i'}, C_{(i, i')} = C_i \times C'_{i'}.$$

Then these subsets satisfy the Simultaneous Triple Product Property in H×H'.

2.

A concrete example using this framework is obtained with the aid of a table with n rows and 3l columns, with each cell labelled with 1, 2, or 3, and with each row having exactly l of each of the three labels. Denote by $U_1(i)$, $U_2(i)$, and $U_3(i)$ the sets of column numbers of cells in row i labeled with 1, 2, and 3, respectively. We call such a table a USP if whenever rows i, j, and k are not all equal, there exists a column in one of the following seven sets:

$U_i(i) \cap U_2(j) \cap U_1(k)$
$U_i(i) \cap U_2(j) \cap U_2(k)$
$U_i(i) \cap U_1(j) \cap U_3(k)$
$U_1(i) \cap U_3(j) \cap U_3(k)$
$U_2(i) \cap U_2(i) \cap U_3(k)$
$U_3(i) \cap U_2(j) \cap U_3(k)$
$U_1(i) \cap U_2(j) \cap U_3(k)$ It follows from Theorem 15.39 in the book Algebraic Complexity Theory by Bürgisser, Clausen, and Shokrollahi (published by Springer-Verlag, 1997) that it is possible to construct a USP with 3l columns and $n=(27/4)^{l-o(1)}$ rows as $l \to \infty$. One can extract a probabilistic construction from the proof of that theorem, but there is no need to do so: even a brute force search for the USP would yield the same exponent of matrix multiplication asymptotically while being a deterministic algorithm.

Let $C_{10}$ denote the cyclic group of order 10. Let $H=C_{10}^{3l}$ and define subsets of H by $A_i = \{(\alpha_1, \alpha_2, \ldots, \alpha_{3l}) : \alpha_j \notin \{0,1\} \text{ if } j \in U_3(i), \alpha_j = 1 \text{ if } j \in U_2(i) \text{ and } \alpha_j = 0 \text{ otherwise}\}$, $B_i = \{(\alpha_1, \alpha_2, \ldots, \alpha_{3l}) : \alpha_j \notin \{0-1\} \text{ if } j \in U_1(i) \text{ and } \alpha_j = 0 \text{ otherwise}\}$, $C_i = \{(\alpha_1, \alpha_2, \ldots, \alpha_{3l}) : \alpha_j \notin \{0,1\} \text{ if } j \in U_2(i) \text{ and } \alpha_j = 0 \text{ otherwise}\}$ for $1 \leq i \leq n$.

These subsets of the abelian group H satisfy the Simultaneous Triple Product Property. When used in our framework, this construction leads to a matrix multiplication algorithm with running time $O(n^{2.41})$, for large values of l.

Example 16

Exemplary Process for Multiple Simultaneous Matrix Multiplication

Figure 3:
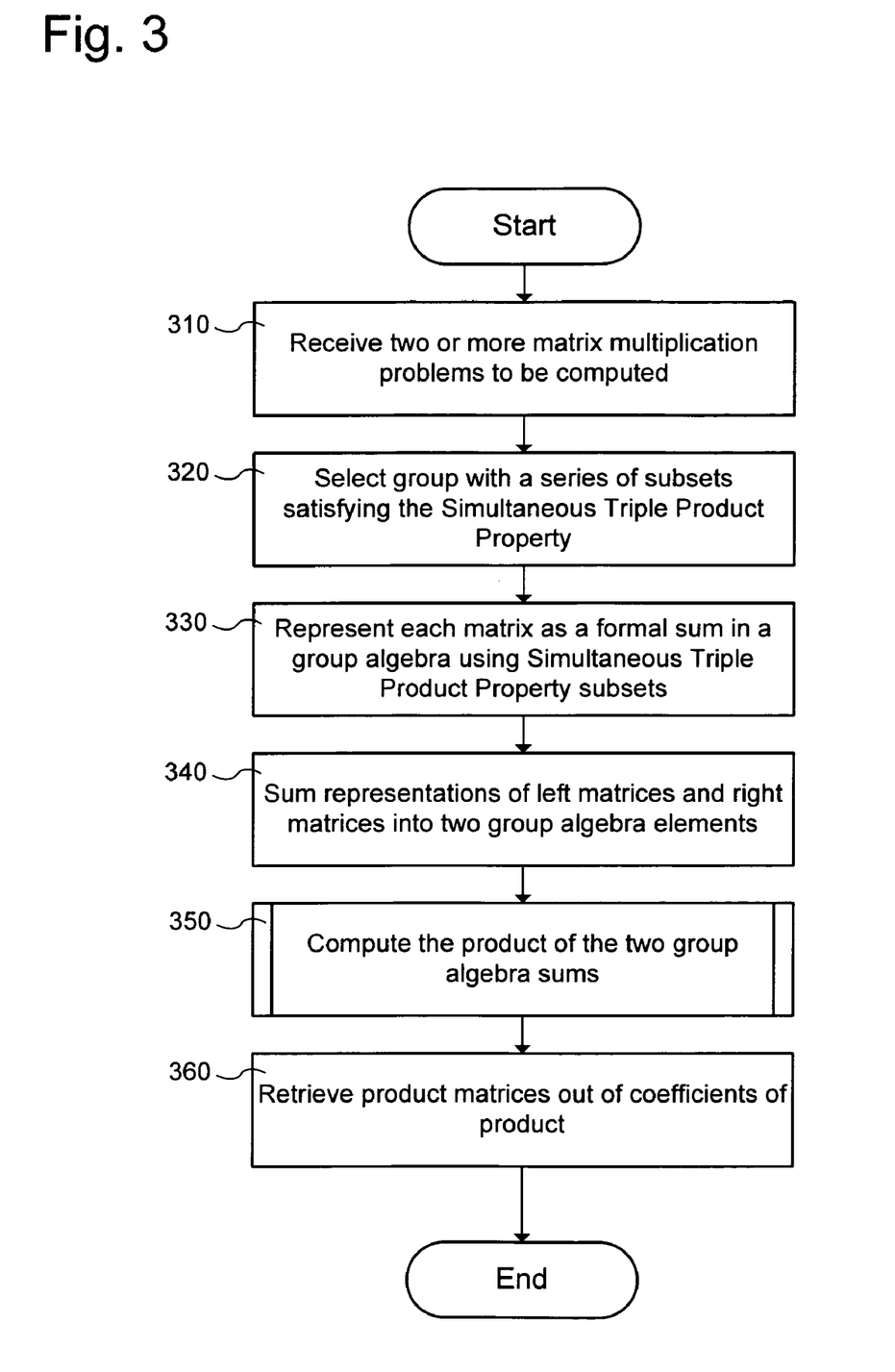
FIG. 3 is a flowchart illustrating an exemplary process for simultaneously creating multiple product matrices from multiple matrices of data.

Example 15 describes a process for simultaneously computing more than one matrix multiplication problem using sets that satisfy a Simultaneous Triple Product Property. FIG. 3 illustrates an example of such a process for simultaneously multiplying multiple matrices. In various implementations, the processes of FIG. 3 may be performed in different order, may be combined into larger processes, or may be split into smaller ones.

The process of FIG. 3 begins at block 310, where two or more matrix multiplication problems are received by a computer system. In one preferred implementation, each multiplication comprises the multiplication of two square matrices of the same size as each other, with each pair allowed to have a different size (or the same size), and with n being the number of matrix multiplications. In another preferred implementation, non-square matrices are received. In either of these implementations, padding with 0s can be added to create n pairs of matrices of a different desired shape. In another implementation, if there is no matrix multiplication to be performed for a certain size, a pair of empty (all 0) matrices is substituted as a placeholder. As described above in the description with respect to FIG. 1, the matrices may comprise elements of various types of fields.

The process then continues to block 120, where a group is chosen to facilitate the multiplications. In a preferred implementation, the group contains a series of n subsets which satisfy the Simultaneous Triple Product Property as described above in Section 15, and whose sizes correspond to the sizes of the n matrix multiplication problems. Section 15 describes one exemplary framework, in which subsets satisfying the Simultaneous Product Property can be constructed using the USP construction.

Next at block 330, each matrix is represented as a formal sum in a group algebra using the subsets satisfying the Simultaneous Triple Product Property as identified above. In one implementation, this is done similarly to the representation as formal sums in the process of FIG. 1, except it is done for each matrix multiplication received at block 310, using the identified subsets of the same size as the matrices in each multiplication. Then, at block 340, the representations of each matrix which is on the left side of one of the multiplications are summed, as are the representations of the matrices on the right side of the multiplications to create two sums which are elements of the group algebra.

At block 350, the product of these sums is computed. In one implementation, this is done using the process of FIG. 2. In another, straightforward multiplication in the group algebra is performed. Next, at block 360, the various product matrices are retrieved out of the coefficients of the product computed at block 350. As described above in Section 15, because the subsets upon which the representations were created satisfy the Simultaneous Triple Product Property, the simultaneous multiplications created by computing the product of the sums will not interfere with each other, and the entries of the various matrix multiplications can be pulled directly from the product, similar to the process of FIG. 1.

Example 17

Exemplary Computing Environment

The above described method of producing product matrices can be implemented on any of a variety of computing devices and environments, including computers of various form factors (personal, workstation, server, handheld, laptop, tablet, or other mobile), distributed computing networks, and Web services, as a few general examples. The method can be implemented in hardware circuitry, as well as in compiling or runtime software executing within a computer or other computing environment, such as shown in FIG. 4.

Figure 4:
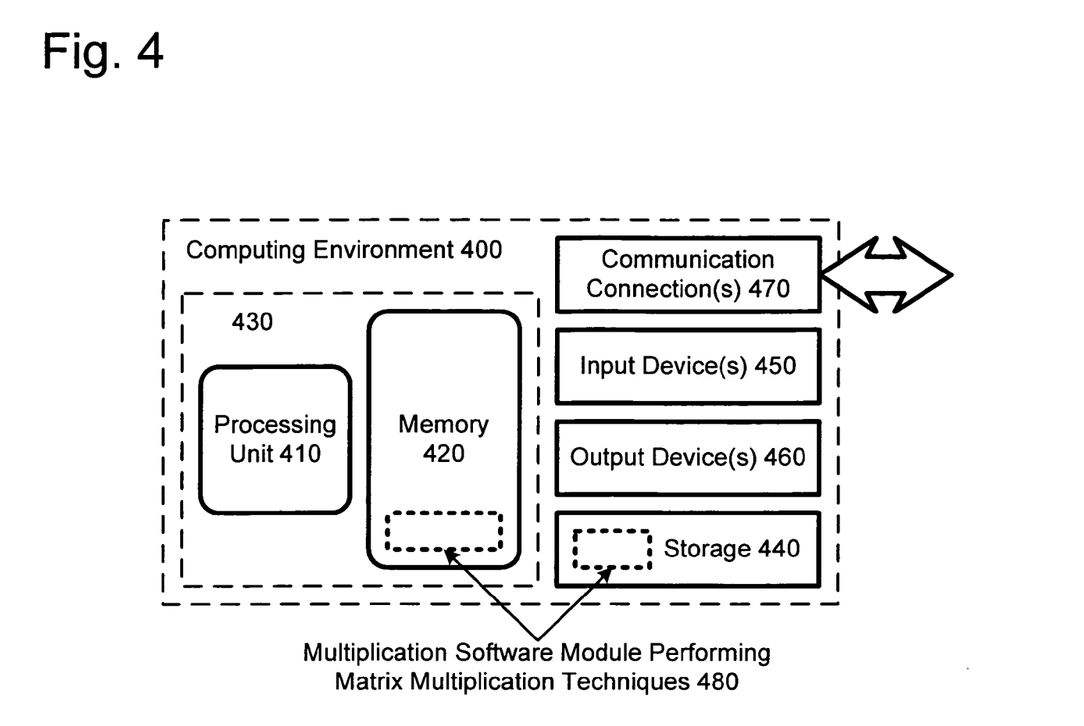
FIG. 4 is a block diagram illustrating an exemplary computing environment for implementing the process of FIG. 1.

FIG. 4 illustrates a generalized example of a suitable computing environment 400 in which the described techniques can be implemented. The computing environment 400 is not intended to suggest any limitation as to scope of use or functionality of the invention, as the present invention may be implemented in diverse general-purpose or special-purpose computing environments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In one implementation, the memory 420 stores a multiplication software module 480 implementing the matrix multiplication techniques. In another implementation the techniques are performed outside of a specific software module.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In one implementation, the storage 440 stores instructions for the compiling and runtime software. In another implementation, matrices which are multiplied and products of matrix multiplication are stored in computer-readable storage medium. In various implementations, this can include both the memory 420 and the storage 440.

The input device(s) 450 may be a touch input device such as a keyboard, mouse, pen, or trackball, a voice input device, a scanning device, or another device that provides input to the computing environment 400. For audio, the input device(s) 450 may be a sound card or similar device that accepts audio input in analog or digital form, or a CD-ROM reader that provides audio samples to the computing environment. The output device(s) 460 may be a display, printer, speaker, CD-writer, or another device that provides output from the computing environment 400.

The communication connection(s) 470 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques herein can be described in the general context of computer-readable media. Computer-readable media are any available media that can be accessed within a computing environment. By way of example, and not limitation, with the computing environment 400, computer-readable media include memory 420, storage 440, communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. One or more computer-readable storage media comprising computer-executable instructions for performing a method for producing a data matrix representing the product of two data matrices in a computer system and thereby providing a performance benefit over direct entry-multiplication techniques measured in processing cycles of the computer system, the method comprising:

receiving first and second data matrices into a computer-readable storage medium;

selecting a first, second, and third subset out of a selected group satisfying a triple product property;

indexing the received first matrix according to the elements of the first and second subsets;

indexing the received second matrix according to the elements of the second and third subsets;

creating a first representation of the first received data matrix and a second representation of the second received data matrix in a form of elements of a group algebra based on the selected group by creating formal sums of elements from the selected group with coefficients taken from entries of the received data matrices, wherein:

entries of the received data matrices are coefficients of respective elements of a formal sum; and entries from the received data matrices are paired with products of the inverse of a respective element corresponding to a first index of the entry and a respective element corresponding to a second index of the entry;

computing the product of the first and second representations in the group algebra; and producing a result data matrix into a computer-readable storage medium by retrieving coefficients of the product in the group algebra.

2. The computer-readable storage media of claim 1, wherein the selected group is known to produce performance benefits for matrices of particular sizes.

3. The computer-readable storage media of claim 1, wherein the selected group supports representation in a group algebra for matrices of a size or sizes smaller than the received first and second matrices, and further comprising partitioning the received first and second matrices to create a matrix whose size is supported by the selected group, and whose entries are matrices.

4. The computer-readable storage media of claim 3, further comprising padding the first and second matrices before partitioning.

5. The computer-readable storage media of claim 1, wherein the first and second matrices comprise a plurality of entries from a field.

6. The computer-readable storage media of claim 1, wherein the first and second matrices comprise entries of measurements of physical phenomena.

7. The computer-readable storage media of claim 1, wherein the first and second matrices comprise entries of statistical or psychological data.

8. The computer-readable storage media of claim 1, wherein the first and second matrices comprise entries of recorded speech data.

9. The computer-readable storage media of claim 8, wherein the entries are of sound measurements.

10. The computer-readable storage media of claim 1, wherein the first and second matrices describe cryptanalytic data.

11. The computer-readable storage media of claim 1, wherein the first and second matrices describe an approximation of heat flow.

12. The computer-readable storage media of claim 1, wherein the first and second matrices describe an approximation of a wave.

13. The computer-readable storage media of claim 1, wherein the first and second matrices describe connections in a computer network or between components in a computer chip.

14. The computer-readable storage media of claim 1, wherein the first and second matrices describe bandwidth or speed between nodes in a communications network.

15. The computer-readable storage media of claim 1, wherein the first and second matrices describe degrees of overlap between searchable documents or genetic sequences.

16. The computer-readable storage media of claim 1, wherein:

the selected group contains a series of subsets which satisfy a simultaneous triple product property;

the first and second matrices together comprise a single matrix multiplication problem; and the first matrix is on the left side of the matrix multiplication problem and the second matrix is on the right side of the problem; and wherein the method further comprises:
receiving one or more additional matrix multiplication problems, each problem comprising a left-side matrix and a right-side matrix; and
creating representations of the matrices comprising the one or more additional matrix multiplication problems in the form of elements of a group algebra based on the series of subsets of the group which satisfy the simultaneous triple product property; and
wherein computing the product of the first and second representations in the group algebra comprises:
summing all of the left-side matrices and all of the right side matrices into two sums in the group algebra; and
computing the product of the sums in the group algebra; and
wherein producing a result data matrix comprises producing a result data matrix for each of the matrix multiplication problems by retrieving coefficients of the product of the sums in the group algebra.

17. The computer-readable storage media of claim 1, wherein the selected group is constructed from a smaller group containing a series of subsets which satisfy a simultaneous triple product property.

18. The computer-readable storage media of claim 1, wherein the series of subsets satisfying a simultaneous triple product property are found using a USP construction.

19. The computer-readable storage media of claim 1, wherein the symmetric group is a symmetric group of size $n(n+1)/2$, wherein n is an integer.

20. The computer-readable storage media of claim 1, wherein the selected group is a linear group of square matrices of determinant 1 with each square matrix comprising entries from a finite field.

21. The computer-readable storage media of claim 1, wherein the selected group is a direct product of other groups.

22. The computer-readable storage media of claim 1, wherein the selected group is a wreath product.

23. The computer-readable storage media of claim 22, wherein the selected group is a wreath product of a symmetric group with an abelian group.

24. The computer-readable storage media of claim 22, wherein the selected group contains subsets which are derived from a nonzero construction or a triangle construction.

25. The computer-readable storage media of claim 1, wherein computing the product of the two representations in the group algebra comprises:
utilizing a Discrete Fourier Transform to map each representation in the group algebra to vectors in a multidimensional vector space, where the dimension of the space is equal to the size of the selected group;
computing the product of the two vectors in the multidimensional vector space; and
using the inverse of the Discrete Fourier Transform to map the product of the two vectors into an element of the group algebra.

26. The computer-readable storage media of claim 25, wherein computing the product of the two vectors in the multidimensional space comprises a point-wise multiplication of the vectors.

27. The computer-readable storage media of claim 25, wherein computing the product of the two vectors in the multidimensional space comprises:
reducing the multiplication to one or more new block-diagonal matrix multiplication problems; and
performing the one or more new block-diagonal matrix multiplication problems.

28. The computer-readable storage media of claim 27, wherein performing the one or more new block-diagonal matrix multiplication problems comprises recursively repeating the performed matrix multiplication method on the new block-diagonal matrix multiplication problems.

29. The computer-readable storage media of claim 28, wherein performing the one or more block-diagonal matrix multiplication problems comprises:
selecting a second group which contains a series of subsets satisfying a simultaneous triple product property;
finding the product matrix for each of the matrix multiplication problems simultaneously by taking the product of sums of representations of the matrices found in the one or more problems, the representations created according to the series of subsets of the second group which satisfy the simultaneous triple product property.

30. A system for producing a data matrix representing the product of two data matrices in a computer system and thereby providing a performance benefit over direct entry-multiplication techniques measured in processing cycles of the computer system, the system comprising:
a computer-readable storage medium containing first and second matrices; and
a computer processor configured to perform the actions of a multiplication software module, the module configured to:
receive indications of a first, second, and third subset out of a selected group which satisfy a triple product property,
index the first matrix according to the elements of the first and second subsets;
index the second matrix according to the elements of the second and third subsets;
create a first representation of the first matrix and a second representation of the second matrix in the form of elements of a group algebra based on the selected group by creating formal sums of elements from the selected group with coefficients taken from entries of the received matrices, wherein:
entries of the received matrices are coefficients of respective elements of a formal sum; and
entries from the received matrices are paired with products of the inverse of a respective element corresponding to a first index of the entry and a respective element corresponding to a second index of the entry;
compute the product of the first and second representations in the group algebra; and
produce a result matrix into a computer-readable storage medium by retrieving the coefficients of the product in the group algebra.

31. The system of claim 30, wherein a multiplication software module configured to compute the product of the first and second representations comprises a multiplication software module configured to:
utilize a Discrete Fourier Transform to map each representation in the group algebra to vectors in a multidimensional vector space, where the dimension of the space is equal to the size of the selected group;
compute the product of the two vectors in the multidimensional vector space; and
use the inverse of the Discrete Fourier Transform to map the product of the two elements into an element of the group algebra.

32. The system of claim 31, wherein a multiplication software module configured to compute the product of the two vectors in the multidimensional space comprises a multiplication software module configured to:
reduce the multiplication to one or more new block-diagonal matrix multiplications; and
perform the one or more new block-diagonal matrix multiplications by utilizing the multiplication module to recursively repeat the performed matrix multiplication method on the new block-diagonal matrix multiplications.

33. One or more computer-readable storage media comprising computer executable instructions for performing a method producing a data matrix representing the product of two data matrices in a computer system and thereby providing a performance benefit over techniques measured in processing cycles of the computer system, the method comprising:
receiving first and second data matrices into a computer-readable storage medium;
selecting a first, second, and third subset out of a selected group which satisfy a triple product property;
indexing the received first matrix according to the elements of the first and second subsets;
indexing the received second matrix according to the elements of the second and third subsets;
creating a first representation of the first matrix and a second representation of the second matrix in a group algebra based on the selected group by creating formal sums of elements from the selected group with coefficients taken from the entries of the received matrices, wherein:
each entry of the received matrices is a coefficient of one element of a formal sum; and
each entry from a matrix is paired with the product of the inverse of the element corresponding to the first index of the entry and the element corresponding to the second index of the entry;
utilizing a Discrete Fourier Transform to map the first and second representations in the group algebra to vectors in a multidimensional vector space, where the dimension of the space is equal to the size of the selected group, wherein the product of the representations can be determined from the product of multiplication of the vectors;
reducing multiplication of the vectors to one or more new block-diagonal matrix multiplications;
recursively repeating the performed matrix multiplication method on the new block-diagonal matrix multiplications to receive a product for the vectors;
using the inverse of the Discrete Fourier Transform to map the product of the two vectors into an element of the group algebra; and
producing a result data matrix into a computer-readable storage medium by retrieving the coefficients of the product in the group algebra.

* * * * *

UNITED STATES PATENT AND TRADEMARK OFFICE
CERTIFICATE OF CORRECTION

| | | |
|---|---|---|
| PATENT NO. | : 7,792,894 B1 | Page 1 of 1 |
| APPLICATION NO. | : 11/011302 | |
| DATED | : September 7, 2010 | |
| INVENTOR(S) | : Henry L. Cohn et al. | |

It is certified that error appears in the above-identified patent and that said Letters Patent is hereby corrected as shown below:

In column 18, line 29, in Claim 30, delete "property," and insert -- property; --, therefor.

Signed and Sealed this
Tenth Day of May, 2011

David J. Kappos
*Director of the United States Patent and Trademark Office*